United States Patent
Van Wingerden et al.

(10) Patent No.: US 12,049,868 B2
(45) Date of Patent: Jul. 30, 2024

(54) ENHANCED WIND TURBINE WAKE MIXING

(71) Applicant: Crosswind C.V., Ijmuiden (NL)

(72) Inventors: Jan Willem Van Wingerden, Barendrecht (NL); Bart Matthijs Doekemeijer, Dordrecht (NL); Joeri Alexis Frederik, Delft (NL)

(73) Assignee: Crosswind C.V., Ijmuiden (NL)

( * ) Notice: Subject to any disclaimer, the term of this patent is extended or adjusted under 35 U.S.C. 154(b) by 0 days.

(21) Appl. No.: 17/776,682

(22) PCT Filed: Nov. 13, 2020

(86) PCT No.: PCT/NL2020/050719
§ 371 (c)(1),
(2) Date: May 13, 2022

(87) PCT Pub. No.: WO2021/096363
PCT Pub. Date: May 20, 2021

(65) Prior Publication Data
US 2022/0412310 A1  Dec. 29, 2022

(30) Foreign Application Priority Data
Nov. 14, 2019 (NL) ..................... 2024238

(51) Int. Cl.
F03D 7/02 (2006.01)
(52) U.S. Cl.
CPC ......... F03D 7/0224 (2013.01); F03D 7/0204 (2013.01); F05B 2260/70 (2013.01)
(58) Field of Classification Search
CPC ...... F03D 7/0224; F03D 7/0204; F03D 7/048; F03D 7/0202; F03D 17/029; F04D 1/0671
See application file for complete search history.

(56) References Cited

U.S. PATENT DOCUMENTS

2015/0050144 A1   2/2015  Westergaard
2017/0350369 A1*  12/2017 Evans ................ F03D 13/20
(Continued)

OTHER PUBLICATIONS

International Searching Authority; International Search Report for International PCT PCT/NL2020/050719 mailed Feb. 22, 2021.
(Continued)

*Primary Examiner* — J. Todd Newton
*Assistant Examiner* — Jackson N Gillenwaters
(74) *Attorney, Agent, or Firm* — McDonnell Boehnen Hulbert & Berghoff LLP

(57) ABSTRACT

Method of controlling a wind turbine comprising a rotor comprising at least a first blade, the method comprising the step of varying an induction factor of the first blade over time by dynamically changing a pitch angle of the first blade over time between a first pitch angle and a second pitch angle while the first blade is rotating, wherein the first pitch angle is different from the second pitch angle, and wherein the dynamic change of the pitch angle over time is controlled such that the respective rotational position of the first blade at which the first blade is at the first pitch angle and the respective rotational positions of the first blade at which the first blade is at the second pitch angle are displaced in time and the varying induction factor of the blade occur at different angular positions in the rotor plane over time, such that a location and/or direction of a wake formed downstream of the wind turbine is dynamically changing with respect to the rotor of the wind turbine.

24 Claims, 5 Drawing Sheets

(56) References Cited

U.S. PATENT DOCUMENTS

| | | | | |
|---|---|---|---|---|
| 2018/0335018 A1* | 11/2018 | Cao | ............... | G05B 23/0286 |
| 2019/0128242 A1* | 5/2019 | Grunnet | ............... | F03D 7/0224 |
| 2021/0047999 A1* | 2/2021 | Gebraad | ............... | F03D 7/048 |
| 2021/0190040 A1* | 6/2021 | Bott | ............... | F03D 7/048 |
| 2021/0207580 A1* | 7/2021 | Egedal | ............... | F03D 7/0204 |

OTHER PUBLICATIONS

International Searching Authority; Written Opinion of the International Searching Authority for International PCT application PCT/NL2020/050719 mailed Feb. 22, 2021.

Sebastiaan Paul Mulders et al; Analysis and optimal individual pitch control decoupling by inclusion of an azimuth offset in the multiblade coordinate transformation: Analysis of IPC decoupling by an offset in the MBC transformation; Wind Energy, vol. 22, No. 3, Nov. 7, 2018 (Nov. 7, 2018), pp. 341-359.

Deepu Dilip et al; Wind Turbine Wake Mitigation through Blade Pitch Offset; Energies, vol. 10, No. 6, May 29, 2017 (May 29, 2017), pp. 1-17.

* cited by examiner

ENHANCED WIND TURBINE WAKE MIXING

The present disclosure relates to a method for controlling a wind turbine, a wind turbine controller arranged for the method of controlling the wind turbine and a wind turbine comprising the wind turbine controller arranged for the method of controlling the wind turbine and an array of wind turbines, wherein at least a first wind turbine comprises the wind turbine controller.

In order to meet the 1.5-degree Celsius climate-stabilizing goal set out by the Paris Agreement, a large reduction in fossil fueled power production is required in the coming years. In order to replace this power production capacity, large increases in renewable energy sources, such as solar and wind energy, are required.

The most effective approach of developing wind energy on a large scale is by placing individual wind turbines, either on land or offshore, in so called wind farms. These wind farms comprise multiple wind turbines, typically of the same type, that are divided over a certain area and typically share a common infrastructure, thereby reducing the overall capital operational expenses of the turbines as well as allowing for efficiently maintaining the wind farm, while at the same time limiting the use of land and/or sea area.

However, when wind turbines extract energy from the wind, a wake is generated downstream of the turbine. In the wake of a wind turbine, the (average) wind speed is reduced and (average) turbulence is increased. This negatively affects turbines located further downstream, as the reduced wind speed leads to a lower energy production and the increased turbulence adds to the fatigue loads endured by the downstream turbine.

As the flow proceeds further downstream, there is a spreading of the wake and thereby a mixing with the surrounding free flow wind, such that the wake recovers towards free stream conditions over time (and thereby distance). Due to the fact that the arrangement of a wind farm is a trade-off between, at least, the area available, installed power and infrastructure costs, it is economically very unattractive to space the wind turbines at such mutual distances that the wake effects are minimized.

In order to optimize the power output on the wind farm level, as opposed to the individual wind turbine level, wind farm control research was focused on steady-state optimal control, also known as so-called axial induction control or the derating approach, wherein a wind turbine arranged upstream in the wind farm is controlled to lower its power production (i.e. to derate its performance) such that a wind turbine arranged downwind can extract slightly more energy from the wind passing the turbine. The goal was to find the optimal static control parameters, irrespective of the dynamics of the wind and the turbines. It was however found that the potential power gain of such a static approach compared to the steady-state "greedy" strategy, where all turbines operate at their individual optimum, can even lead to lower overall power production.

It may be a goal of the present disclosure, possibly next to other goals, to obtain a method for controlling a wind turbine that reduces the wake effects downstream of the wind turbine, wherein at least one of the above mentioned problems is at least partially alleviated.

This goal, amongst other goals, may at least partially be met by a method of controlling a wind turbine comprising a rotor comprising at least a first blade, the method comprising the step of varying an induction factor, in particular a radial induction factor, of the first blade over time by dynamically changing a pitch angle of the first blade over time between a first pitch angle and a second pitch angle while the first blade is rotating, wherein the first pitch angle is different from the second pitch angle, and wherein the dynamic change of the pitch angle over time is so that the respective rotational positions of the first blade at which the blade are at the first pitch angle and second pitch angle are displaced in time, such that a location and/or direction of a wake formed downstream of the wind turbine is dynamically changing with respect to the rotor of the wind turbine.

In a further aspect of the disclosure, it is also possible to, instead of dynamically changing a location and/or direction of a wake formed downstream of the wind turbine with respect to the rotor of the wind turbine, to control a dynamic variation of the pitch angle over time such that a shape (instead of a location and/or direction) of a wake formed downstream of the wind turbine is dynamically changing with respect to the rotor of the wind turbine. The changing shape can for instance correspond to a wake having a substantially constant shape that rotates a along the axis of the rotor over time, preferably at a rotational speed that is (significantly) lower than the rotational speed of the rotor.

A wind turbine comprises a rotor comprising at least one blade, although typically comprising multiple blades, for instance two or three blades, to convert kinetic energy of the wind into mechanical energy that is converted by an electric generator into electrical energy. Specifically, the velocity of the wind causes the blades to rotate which in turn power the electric generator. The rotating blades (effectively forming a rotor disc), however, slow down the wind and cause a wake to form behind the turbine. The wind within the wake has a slower average velocity, and a higher average turbulence, than the wind that passed around the rotor disc that did not pass through the turbine's blades. Moreover, the slower velocity of the wind in the wake relative to the velocity of the wind unaffected by the rotor causes a wake expansion, i.e. the diameter of the wake to expand beyond the diameter of the rotor. Generally, the wake defines a volume of fluid (e.g., air) that is affected by the blades of a turbine. Any turbine arranged downstream (downwind) within this wake can only use the relatively slower wind velocity to turn its blades, thereby leading to a lower power output of the downwind turbine. In addition, due to the increased average turbulence, the downwind turbine will also experience more fatigue loading, thereby negatively affecting its lifetime.

By transferring kinetic energy from the wind surrounding the wake into the wake itself, the relative velocity and turbulence differences of the wind in the wake and the surrounding air slowly decreases over time. This process is called turbulent mixing. Because turbulent mixing happens naturally, the kinetic energy transferred from the wind to the wind turbine will eventually be replaced. However, the distance required to transfer the kinetic energy into the wake depends on the wind speed. Therefore, a distance between a first and second turbine positioned close together (typically less than 10 rotor diameters, i.e. 10 D) may not be enough to return the kinetic energy taken by the first turbine before the wind reaches the second turbine arranged downstream of the first wind turbine.

Generally, the induction factor is determined by dividing the difference of the velocity of the wind upstream of a rotor plane $V_\infty$ and the velocity of the wind at the rotor plane (i.e. rotor disc) $V_d$ by the velocity of the wind upstream $V_\infty$, such that:

$$a = \frac{V_\infty - V_d}{V_\infty}$$

Moreover, each blade may have an individual induction factor associated with it. The induction factor for a blade may be changed by pitching the blade with respect to the wind, i.e. rotating the blade around its longitudinal axis such that an angle between the cross section of the blade and the rotor plane changes. By changing the induction factor of a blade, one can locally vary the speed and direction of the wind exiting the rotor plane and hereby actually change the location of the wake itself.

By also displacing the respective rotational positions of the first blade at which the blade is at the first pitch angle and, preferably, second pitch angle in time, the induction-variations (i.e. the varying induction factor) of the blade occur at different angular positions in the rotor plane over time. Hereby the location of a wake formed downstream of the wind turbine is also dynamically changing with respect to the rotor of the wind turbine. Such variations of the location of the wake increase the turbulent mixing, such that the distance required to transfer the kinetic energy into the wake is decreased and any turbines that might be arranged downstream of the wind turbine are thereby much less affected by the wake. In case of multiple blades, pitch angle of at least the first blade is preferably arranged to be individually changed with respect to the other blades.

In an optional embodiment, the method comprising the step of imposing yaw and tilt moments on the rotor for obtaining forced wake mixing by superimposing a periodic variation of the pitch angle on a first (e.g. collective) blade pitch angle of the wind turbine for dynamically changing a pitch angle of the first blade. The benefit of the approach is thus that an improved wake mixing can be obtained by applying only minor changes (i.e. by superimposing a periodic variation onto the pitch angle) to existing control approaches for wind turbine.

In an optional embodiment of the method, the step of varying the induction factor of the first blade over time further comprises dynamically changing the pitch angle of the first blade according to a predefined periodic function, and wherein the predefined periodic function is defined so that the respective rotational positions of the first blade at which the blade are at the first pitch angle and second pitch angle are displaced in time. A periodic variation, i.e. according to a predefined periodic functions is a simple and effective manner to ensure that that the respective rotational positions of the first blade at which the blade are at the first pitch angle and second pitch angle are displaced in time and thereby enabling on to dynamically change the location and/or direction of the wake formed downstream of the wind turbine.

In an optional embodiment of the method, the predefined periodic function is defined such that the rotational position of the blade in the rotor plane at which the blade is at the first pitch angle is displaced from rotation to rotation. Due to the induction-variation of the blade that occur at different angular positions in the rotor plane, the resulting thrust-force acting on the blade will also vary along with the induction-variation, such that a periodical change of the orientation of the thrust force is experienced by the entire rotor, without significantly altering the amplitude of the force itself. Thus only a relatively small variation of the thrust forces is experienced, such that they do not add much to the fatigue loading induced on the turbine. In particular, if the displacement from rotation to rotation is relatively slow, for instance less than 180° per rotation, preferably less than 90° per rotation, more preferably less than 45° per rotation, periodically changing the orientation of the thrust force is a low frequent force variation that does not lead to a significant increase in fatigue loading of the turbine.

In an optional embodiment, the rotor comprises a second blade, the method comprising the step of varying an induction factor of the second blade over time by dynamically changing a pitch angle of the second blade between a first pitch angle and a second pitch angle, wherein a time at which the first blade is at the first pitch angle differs from a time at which the second blade is at the first pitch angle. Varying the pitch angle of the first blade might lead to some unbalance in the rotor. By also dynamically changing a pitch angle of the second blade as described here, the unbalance can, at least partly, be compensated for.

In an optional embodiment, the rotor comprises a second blade, that is preferably arranged such that its pitch angle can be changed individually with respect to, or independent of, the pitch angle of the first blade, and wherein the method preferably comprises the step of varying an induction factor of the second blade over time by dynamically changing a pitch angle of the second blade according to the predefined periodic function and wherein the dynamic change of the pitch angle of the second blade differs by a phase offset with the dynamic change of the pitch angle first blade. By also varying the induction factor of the second blade according to the predefined periodic function, but with a phase offset with respect to the first blade, the pitch angles of the first and second blades (and thus their induction factors) are not simultaneously at their maximum or minimum. If the induction factors would be simultaneously at their maximum or minimum, the turbine would effectively be derated, and its electrical production decreased, as the induction factor of the rotor as a total would be varied, rather than creating local variation which have only a small impact on the induction factor of the total rotor and thus on the power output of the turbine.

The phase offset may be selected to be substantially equal to an angle of intersection between the first and second blade in the rotor plane. For, for instance, a two bladed turbine the angle of intersection is approximately 180°. By also having a phase offset of around 180°, the minimum induction factor of the first blade is at the same time compensated by a maximum of the second blade, such that for the total rotor the variation of the total induction factor is minimal. For, for instance, a three bladed turbine the angles of intersection are approximately 120°. By also having the phase offset of around 120°, a minimum induction factor of the first blade is approximately compensated for by the other two blades.

According to an optional embodiment of the method, the dynamic change of the pitch angle over time is obtained by performing a reverse multiblade coordination (MBC) transformation on a time-varying yaw function that is defined in a non-rotating reference frame, or on a time-varying tilt function that is defined in a non-rotating reference frame, or on a combination of the time-varying yaw and tilt functions. The Multi-Blade Coordinate (MBC) is typically used to transformation moments on the blades from a local blade-frame to a non-rotating, or earth-fixed inertial, frame to determine the loading on, for instance, the tower of the turbine. By defining time-varying yaw- and/or tilt signal in the non-rotating frame that can respectively steer the wake horizontally and/or vertically, and performing a reverse MBC transformation, the signals are transformed to the local blade-frame and thereby obtaining the dynamic change of the pitch angle of, at least, the first blade.

In embodiments of the present disclosure the time-varying yaw function is periodic yaw function and/or the time-varying tilt function is a periodic tilt function. By performing the reverse multiblade coordination (MBC) transformation, a predefined periodic function is obtained, such that dynamically changing the pitch angle over time is dynamically changing the pitch angle according to the predefined periodic function. Hereby, relatively simple functions can be implemented for achieving the desired effects given above. Preferably, the periodic tilt function and/or periodic yaw function is a sinusoidal function with a predetermined frequency. The reverse transformation thereby leads to a periodic pitch functions for the individual blade(s), whereby the periodic pitch function is also a sinusoidal function, or a superposition of sinusoidal functions, such that a smooth pitch signal is obtained. Due to the size and weights of the individual blades of, especially, utility scale wind turbines, a smooth pitch signal is preferred, as thereby no sudden, impact-like, excitations are introduced through the pitch mechanism, as these would excite all kinds of unwanted dynamics of the wind turbine structure and introduce an increased loading on the turbine and its components.

In an embodiment of the method, the predefined periodic function comprises a first sinusoidal function with a first frequency, wherein the first frequency differs from the rotational frequency of the rotor or its multiples. Alternatively, the predefined periodic function comprises a superposition of the first sinusoidal function and a second sinusoidal function with a second frequency, wherein the first and second frequencies are different. As explained above, a sinusoidal function, or a superposition of sinusoidal functions, gives a smooth periodic pitch angle variation.

The value of the first frequency or the value of the second frequency may be selected to be substantially equal to the rotational frequency of the rotor increased with or decreased with a predetermined frequency, the predetermined frequency being a nonzero frequency smaller than the rotational frequency. The dynamic change of the pitch angle of at least the first blade according to a predefined periodic function is thereby a relatively slow change compared to the rotational frequency of the turbine. Hence, these low frequency signals give a slow and smooth periodic pitch angle variation that is not expected to result in a significant increase of the loading on the turbine, while at the same time relatively slow change of the location and direction of the wake is obtained that leads to increased wake mixing. Due to the predetermined frequency being a nonzero frequency smaller than the rotational frequency, the effect of improved wake mixing is obtained as described above, while at the same time the pitching action of the blades is only slightly increased, when compared to, for instance, existing individual pitch control methods for load mitigation, such that the additional loading on the pitch system, and especially the pitch bearings that are often the most fatigue-critical parts of the pitch system, is limited.

The predetermined frequency is preferably determined at least in dependence of a diameter of the rotor, a rotational speed of the rotor and/or an inflow wind speed that is determined upstream of the wind turbine. Hereby, the predefined periodic function is customized to different operational conditions or turbine sizes, such that an increased wake mixing can be obtained for the different operational conditions and turbine sizes. Alternatively, or additionally, the predetermined frequency is preferably determined at least in dependence of the Strouhal number, wherein the Strouhal number is preferably between 0.05 and 1.0, more preferably between 0.15 and 0.55 and even more preferably between 0.2 and 0.3, most preferably around 0.25.

The predetermined frequency of the periodic tilt and/or yaw functions can be determined with a dimensionless number called the Strouhal number:

$$St = \frac{fD}{U_\infty}$$

that defines a relationship between the inflow wind speed $U_\infty$, the turbine rotor diameter D and the predetermined frequency f. Based on computer simulations using a simulation program, Simulator fOr Wind Farm Applications (SOWFA), for different frequencies in laminar flow conditions it was estimated that an optimal Strouhal number is preferably between 0.05 and 1.0, more preferably between 0.15 and 0.55 and even more preferably between 0.2 and 0.3, most preferably around 0.25. Applying any embodiment with a predetermined frequency, determined according to such a Strouhal number, was found to give an excellent wake mixing.

In an optional embodiment of the method the difference between the first and second pitch angle is 30° or less, preferably 20° or less, more preferably 10° or less, most preferably between 2° and 8°. A too large variation of the pitch angle will lead to a decreased performance of the turbine, whereas a too small variation will not lead to a required amount of wake mixing. A good trade-off between these two was found in the above given ranges.

In a second aspect of the disclosure, there is provided a wind turbine controller arranged for controlling a wind turbine comprising a rotor comprising at least a first blade, wherein the controller is arranged for varying an induction factor of the first blade over time by dynamically changing a pitch angle of the first blade according to a predefined periodic function such that the pitch angle of the first blade periodically varies between a first pitch angle and a second pitch angle while the first blade is rotating, wherein the first pitch angle is different from the second pitch angle, and wherein the predefined periodic function is defined so that the respective rotational positions of the first blade at which the blade are at the first pitch angle and second pitch angle are displaced in time, such that the controller is arranged for dynamically changing a location of a wake formed downstream of the wind turbine with respect to the rotor of the wind turbine. Hereby, the advantages of the control method are applied in the controller.

In a third aspect of the disclosure, there is provided a wind turbine comprising a rotor comprising at least a first blade, further comprising a wind turbine controller arranged for the method of controlling the wind turbine according to any of the embodiments given. Hereby, a wind turbine is obtained that is able to improve the mixing in the wake that forms downstream of the turbine.

In a further aspect, there is provided an array of at least two wind turbines, wherein, for a given wind direction, a second wind turbine is arranged at least partially downstream in a wake of the first wind turbine, wherein the first and second wind turbine comprise a rotor comprising at least a first blade, and wherein at least the first wind turbine comprises a wind turbine controller arranged for the method of controlling the wind turbine according to any of the embodiments given. Hereby, an array of turbines, e.g. a wind farm, is obtained wherein at least one turbine is configured for improving mixing in the wake that forms downstream of the turbine, such that the electric energy production of the array of wind turbines, i.e. the wind farm, can be further increased.

The present disclosure is further illustrated by the following figures, which show exemplifying embodiments of the method for controlling the wind turbine according to the disclosure, and are not intended to limit the scope of the disclosure in any way, wherein:

FIG. 1A schematically shows a horizontal axis wind turbine comprising a three bladed rotor.

FIG. 1B schematically shows a pitched blade.

FIG. 2 schematically shows a nacelle and rotor of the wind turbine comprising different components.

FIG. 3 schematically shows an array of two wind turbines, wherein the second wind turbine is arranged downstream in a wake of the first wind turbine.

Figure 6A:
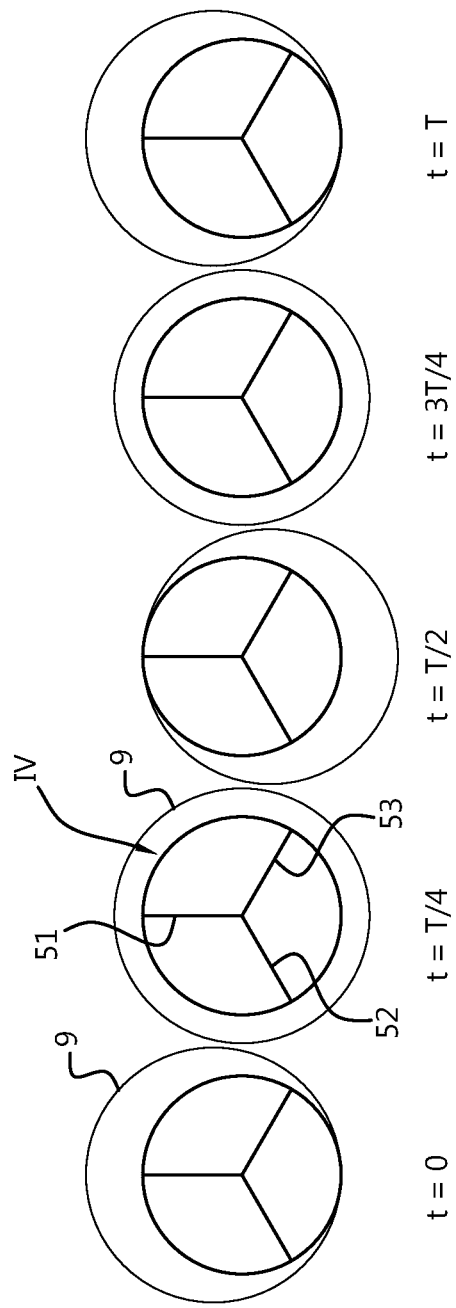
Figure 6B:
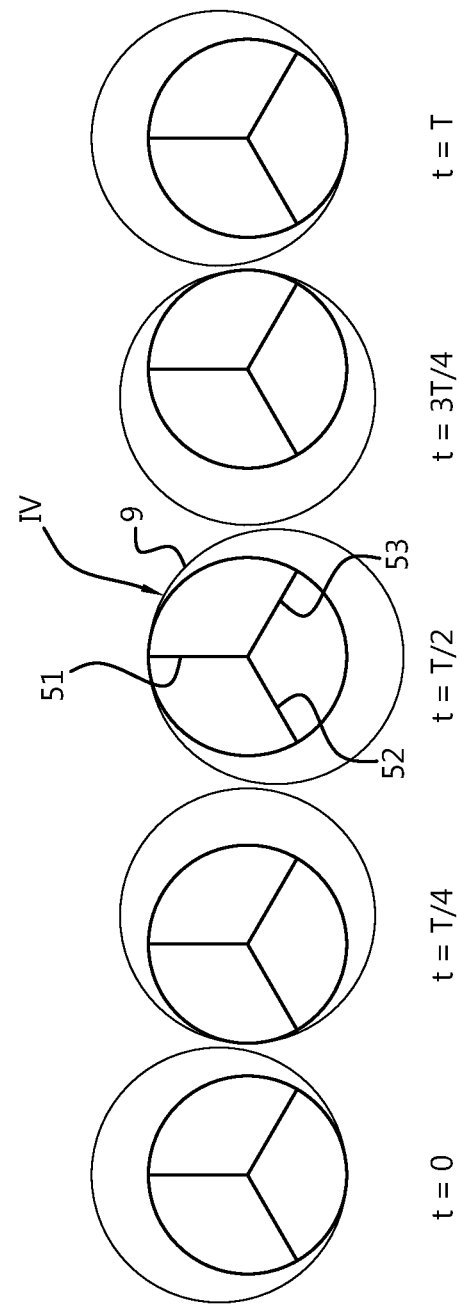

FIGS. 6A and 6B schematically show the location of the wake at different time instances during one excitation period T for a turbine controlled with respectively two different embodiments of the method.

Figure 7:
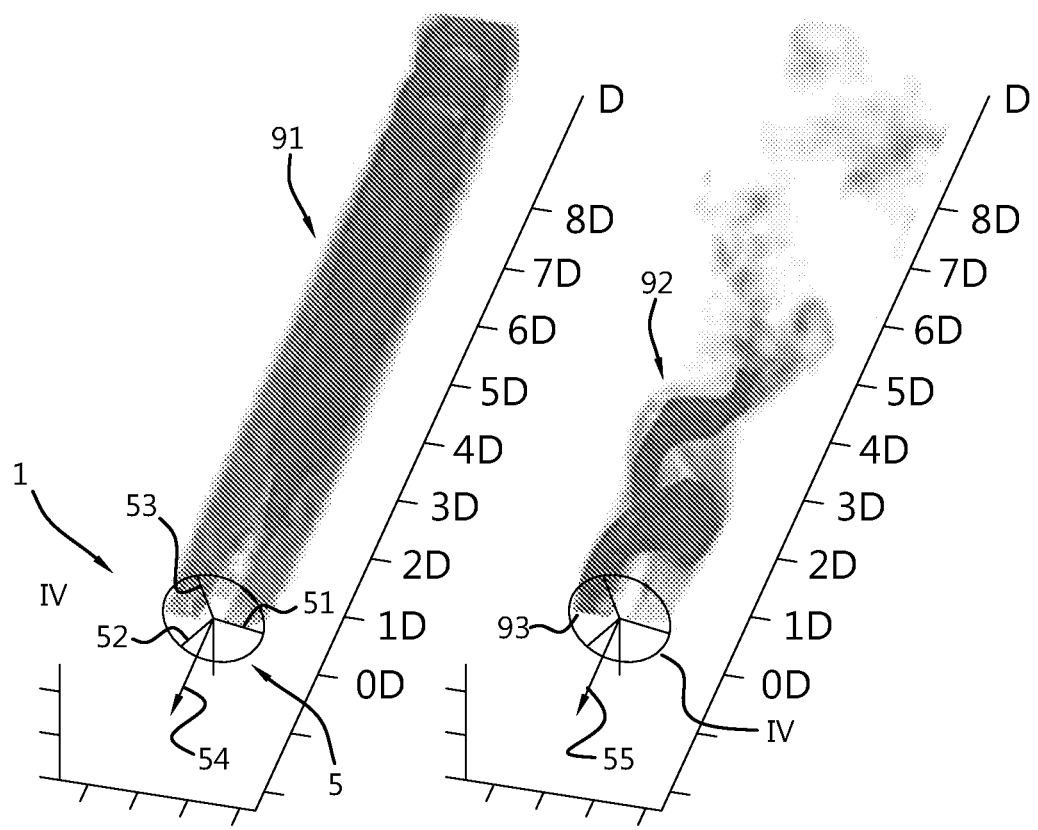

FIG. 7 shows the difference in the wake generated by a turbine controlled using a greedy control approach and a wake generated by a turbine controlled using an embodiment of the method of controlling the wind turbine according to the disclosure.

Figure 1A:
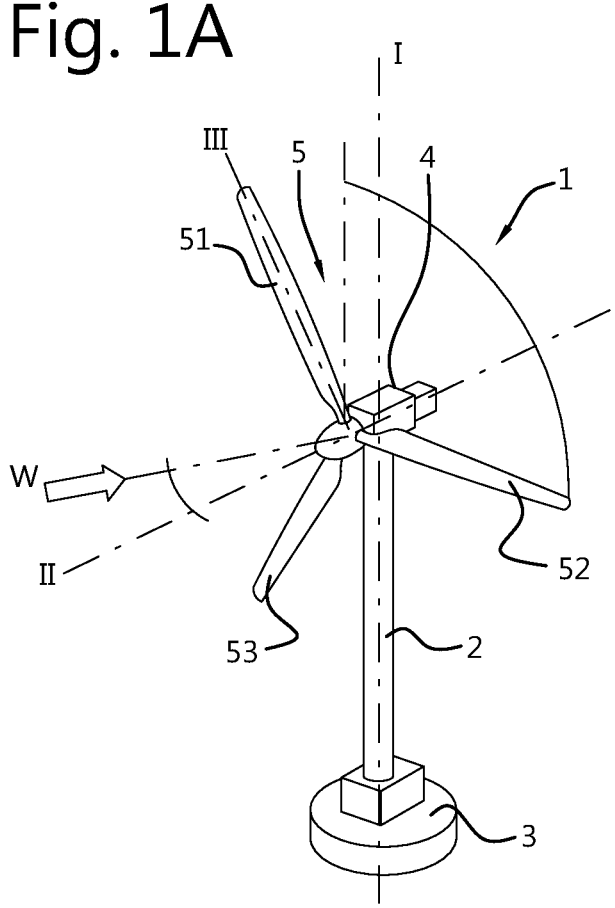

FIG. 1A schematically shows the layout of a typical three bladed horizontal axis wind turbine 1. The wind turbine comprises a tower 2, situated on top of a foundation 3. Note that such wind turbines can be arranged on land (e.g. onshore) and at sea (e.g. offshore). In the latter case, the foundation 3 will typically be an offshore foundation, being for instance seabed-fixed structures installed into the seabed such as monopiles, tripods, jackets, or alternatively a floating foundation, wherein a buoyant body is secured to the seabed to keep it into place. In case of an onshore turbine, such a foundation 3 is typically a so called gravity foundation comprising a heavy concrete body to keep the wind turbine 1 secured to the ground.

Figure 1B:
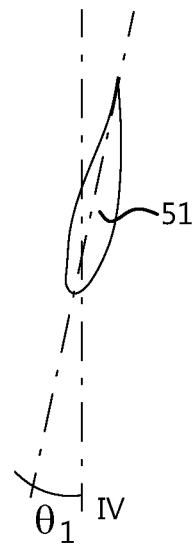

A nacelle 4, which is coupled to a rotor 5, is arranged on top of the tower 2. The rotor 5 comprises three blades 51, 52, 53, although any amount of blades is possible, for instance one, two or four blades can also be applied. The blades 51, 52, 53 are fixed to a hub 54. A rotation of the nacelle 4 around the vertical axis I, which is substantially parallel, or coincides, with the tower 2 and which is substantially perpendicular to the ground plane, is referred to as a yaw rotation. The yaw angle can be defined in dependence of a wind direction, in which case a non-zero yaw angle means that there is a misalignment between the direction of the rotor axis II and the wind direction W. The rotor 5 is arranged to rotate around the rotor axis II, this rotation is often referred to as the azimuth rotation. The blades 51, 52, 53 are furthermore arranged to rotate around their respective longitudinal axis III, which rotation is referred to as the pitch rotation and an angle between a central axis V of a cross section the blade 51, 52, 53 with respect to plane of rotation IV of the rotor 5 is referred to as the pitch angle. FIG. 1B shows the central axis V of the cross-section of the first blade 51 being pitched at a pitch angle $\theta_1$ with respect to the rotor plane IV.

Figure 2:
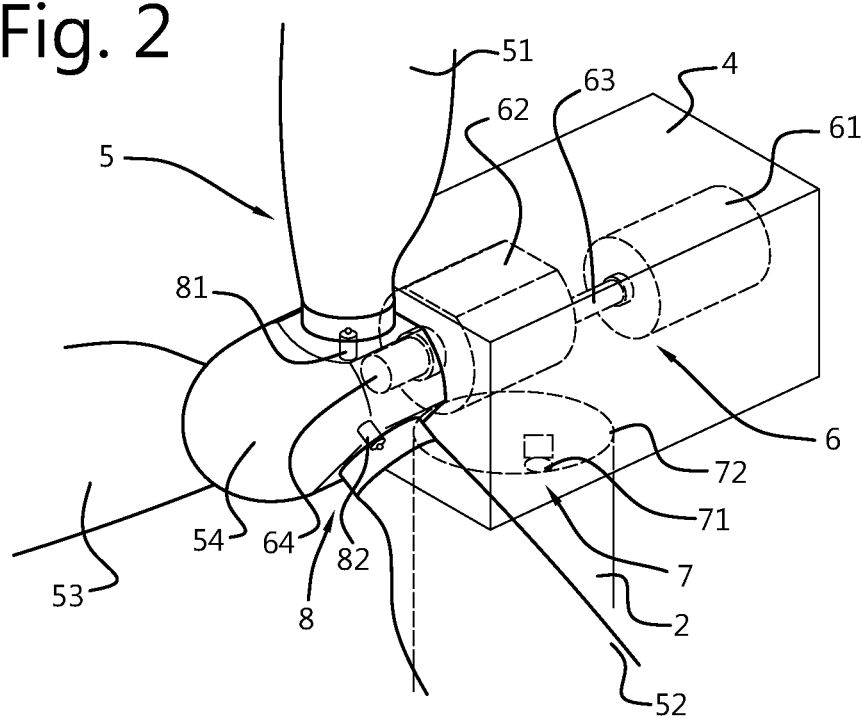

FIG. 2 schematically shows a nacelle 4 and rotor 5 of the wind turbine 1, wherein different components arranged in the nacelle 4. The nacelle 4 houses the drive train 6, that can comprise a generator 61 for generating electrical energy, a gearbox 62 arranged between a high-speed shaft 63 and low speed shaft 64, wherein the low speed shaft 64 is connected to the rotor 5 and the high-speed shaft 63 transfers the rotation from the output of gearbox 62 to the generator 61. Note that in so called direct drive wind turbines the rotor is directly connected, usually through a main shaft, or low speed shaft, to a generator. In these types of wind turbines, the gearbox 62 and high-speed shaft 63 are not needed.

Furthermore, the nacelle 4 typically also comprises a yaw mechanism 7 for yawing the nacelle 4 around the tower 2, in particular the vertical axis I. The yaw mechanism 7 can comprise a number of yaw motors 71 attached to a base of nacelle 4 and comprising a gearing for reducing the rotational speed towards an output drive pinion that can be meshed with a gear rim 72 with teeth on the inner side, which in turn is connected to a top of the tower 2. Furthermore, a pitch mechanism 8 is comprised (at least partially) in the hub 54, wherein the pitch mechanism 8 is arranged for pitching the blades 51, 52, 53. In the current embodiment of the turbine 1, the pitch mechanism 8 comprises three pitch drives 81, 82, 83 that are arranged to drive the ends of blade root sections 55, 56, 57 of the respective blades 51, 52, 53. The pitch drives 81, 82, 83 are arranged to individually drive the pitch rotations of the respective blades 51, 52, 53, such that the blades 51, 52, 53 can all have different pitch angles at any given time. Such a pitch mechanism 8 is also referred to as an individual pitch mechanism and controlling the individual pitch mechanism for minimizing the fatigue loading on a turbine is referred to as Individual Pitch Control (IPC).

Figure 3:
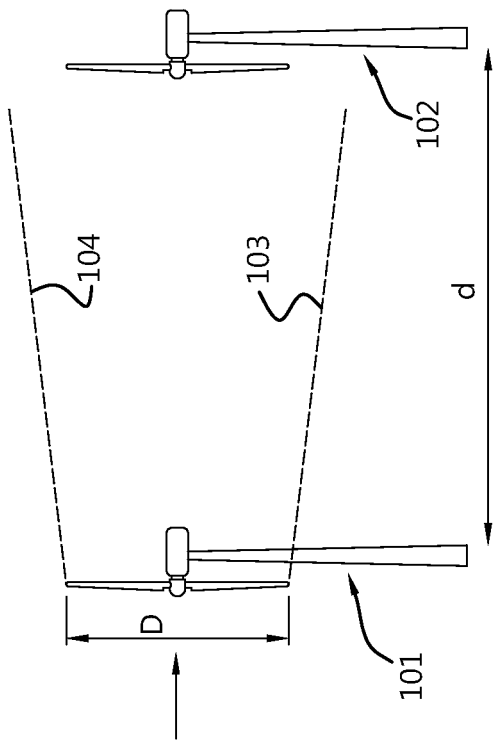

FIG. 3 schematically shows an array of two wind turbines, wherein the wind direction W is such that the second wind turbine 102 is positioned downstream in a wake of the first wind turbine 101. The wake can be considered a region, as indicated between dashed lines 103, 104, of reduced (average) wind speeds with an increased turbulence. The wake caused by the wind turbine 101 will slowly mix with the surrounding (unaffected) wind field and due to this mixing the wake effects will reduce with increasing distance from the turbine. Turbines 101, 102 are typically placed at mutual distances d of three to ten times the rotor diameter (3D-10D), wherein a mutual distance of ten times the rotor diameter will obviously lead to lower wake effects, such as a reduced power output and reduced vibrations and thereby reduced induced fatigue loading on different wind turbine components, than a mutual distance of only three times the distance. Nonetheless, as already described above, a wind farm typically has to be developed within a limited space, such that the longer mutual distances might lead to a reduced power output of the entire farm and thereby a higher cost of the generated energy. It is thus beneficial to be able to increase the wake mixing and to reduce the length and/or intensity of the wake, such that turbines can be placed at smaller distances, while still providing a higher power output with less induced fatigue loading.

Figure 4:
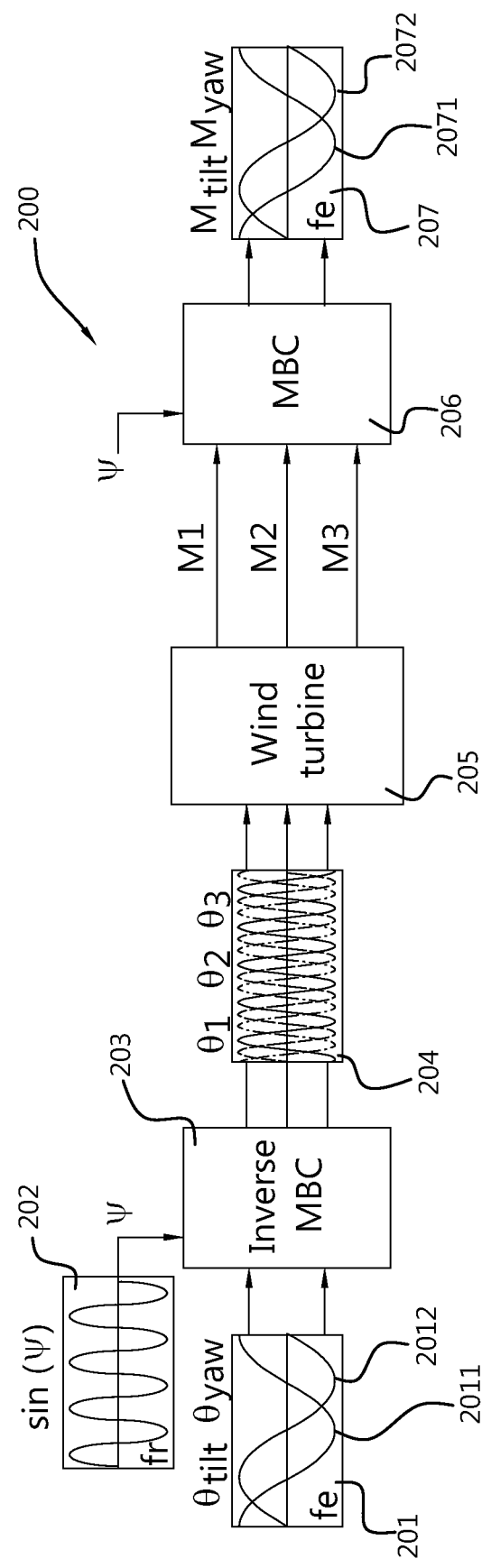
FIG. 4 shows a flow-chart comprising different steps comprised in an embodiment of the method of controlling the wind turbine.

FIG. 4 shows a block chart, or flow chart 200, of steps of an embodiment of the control method for controlling the wind turbine. In step 201 periodic tilt and yaw functions 2011, 2012 are defined, wherein the periodic tilt and yaw functions 2011, 2012 are defined as sinusoidal function with a common predefined frequency f, and wherein the periodic tilt and yaw functions 2011, 2012 have a certain phase offset of preferably 90° or 270°. Hence, in this specific embodiment, called Helix IPC, both tilt and yaw degrees-of-freedom are excited, but with a phase offset of π/2 rad (90°). This will result in a moment on the rotor disc (as seen in the non-rotating frame) that rotates over time, completing one rotation every T=1/f seconds, and leading to a helix-shaped wake 92, as is seen in FIG. 7.

The predetermined frequency f of the periodic tilt and yaw functions 2011, 2012 can be determined with respect to the inflow wind speed $U_\infty$ and the turbine rotor diameter D on the basis of a dimensionless number called the Strouhal number:

$$St = \frac{fD}{U_\infty}$$

Figure 5:
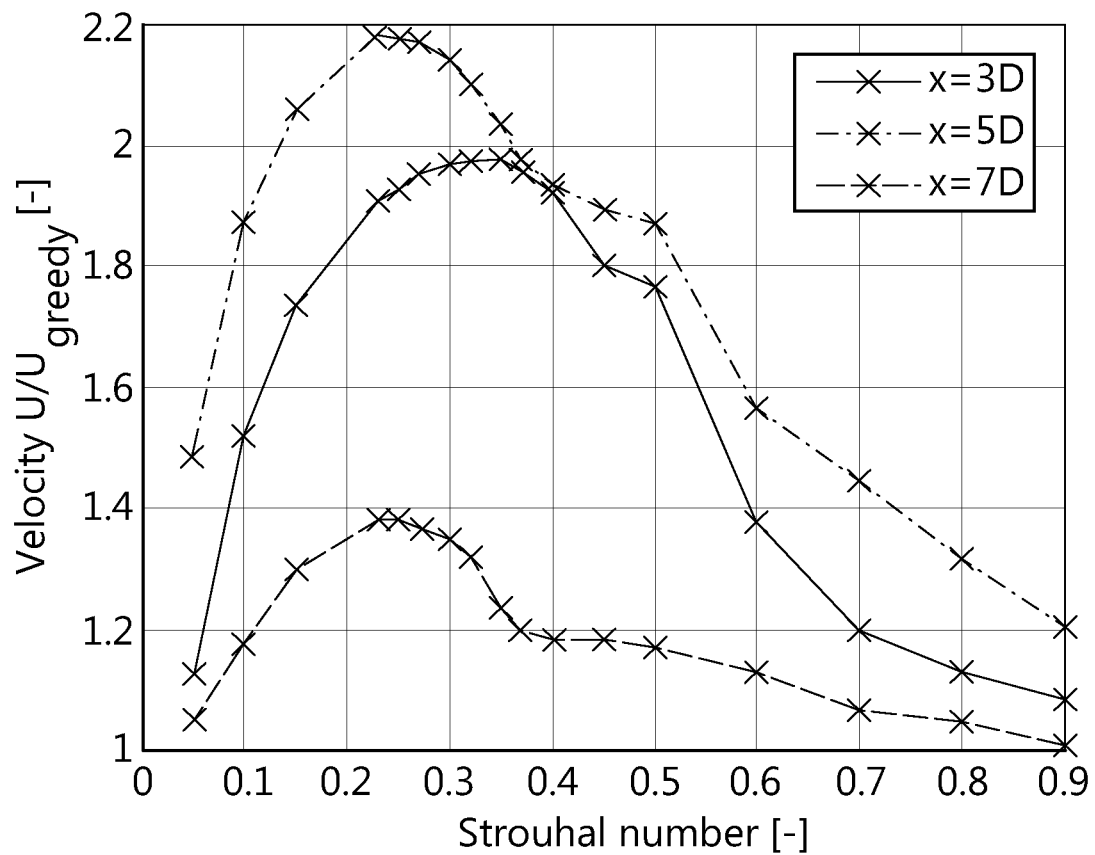
FIG. 5 shows a graph representing average wake velocities at different distances behind a turbine controlled on the basis of different Strouhal numbers. The velocities are normalized by dividing by the wake velocity at each location when greedy control is applied.

An optimal Strouhal number is preferably between 0.05 and 1.0, more preferably between 0.15 and 0.55 and even more preferably between 0.2 and 0.3, most preferably around 0.25. An estimation of this optimum has been obtained by doing a grid search in a simulation program, Simulator fOr Wind Farm Applications (SOWFA), for different frequencies in laminar flow conditions. The resulting average wake velocities at different distances behind the excited turbine are shown in FIG. 5, which shows a graph representing the average wake velocity at different distances behind a turbine excited with different frequencies. The velocities are normalized by dividing by the wake velocity at each location when greedy control is applied. FIG. 5 shows that, for a number of different distances from the rotor wherein the distance is given in number of rotor diameters D (3D, 5D and 7D), the peak is around St=0.25. The Strouhal number can be chosen on the basis of these results for determining the excitation frequency. Furthermore, a pitch amplitude β is preferably 15° or less, more preferably 10° or less, even more preferably 5° or less, most preferably between 2° and 4°, as a too large pitch amplitude of the (preferably) sinusoidal pitch variations will lead to increased loading on the turbine.

An inverse multiblade coordinate (MBC) transformation step (203) is applied for obtaining the periodic variation of the pitch angles $\theta_1, \theta_2, \theta_3$ of the respective blades 51, 52, 53. A MBC transformation decouples, or stated differently: projects, the blade loads in a non-rotating reference frame and is a transformation used in for instance Individual Pitch Control approaches that aim at lowering fatigue loading of the wind turbine. The rotor speed dependent n-times-per-revolution (nP) load harmonic is transferred to a steady-state contribution, simplifying controller design. The equations effectuating the transformation are summarized. The measured out-of-plane blade root bending moments $M(t) \in R^B$ are supplied to forward transformation, transforming the rotating blade moments into a non-rotating reference frame (as also shown in for instance step 207):

$$\begin{bmatrix} M_{0,n}(t) \\ M_{t,n}(t) \\ M_{y,n}(t) \end{bmatrix} = T_n(\psi) \underbrace{\begin{bmatrix} M_1(t) \\ M_2(t) \\ M_3(t) \end{bmatrix}}_{M(t)},$$

with $$T_n = \frac{2}{B} \begin{bmatrix} 1 & 1 & 1 \\ \cos(n\psi_1) & \cos(n\psi_2) & \cos(n\psi_3) \\ \sin(n\psi_1) & \sin(n\psi_2) & \sin(n\psi_3) \end{bmatrix},$$

in which $n \subset Z^+$ is the harmonic number, $B \in Z^+$ the total amount of blades, and $\psi_b \subset R$ the azimuth angle for blade $b \subset Z^+$, where $\psi=0°$ indicates the vertical upright position. The collective mode $M_0$ represents the cumulative out-of-plane rotor moment, and $M_t$ and $M_y$ represent the fixed frame and azimuth-independent tilt- and yaw-moments (2071, 2072), respectively. The latter two mentioned components are typically used for the purpose of fatigue load reductions.

By applying the reverse MBC transformation to the non-rotating signals (of step 201), this yields implementable individual pitch contributions in the rotating (i.e. blade) frame.

$$\begin{bmatrix} \theta_{1,n}(t) \\ \theta_{2,n}(t) \\ \theta_{3,n}(t) \end{bmatrix} = T_n^{-1}(\psi + \psi_o) \begin{bmatrix} \theta_{0,n}(t) \\ \theta_{t,n}(t) \\ \theta_{y,n}(t) \end{bmatrix},$$

with $$T_n^{-1} = \begin{bmatrix} 1 & \cos[n(\psi_1 + \psi_{o,n})] & \sin[n(\psi_1 + \psi_{o,n})] \\ 1 & \cos[n(\psi_2 + \psi_{o,n})] & \sin[n(\psi_2 + \psi_{o,n})] \\ 1 & \cos[n(\psi_3 + \psi_{o,n})] & \sin[n(\psi_3 + \psi_{o,n})] \end{bmatrix},$$

where $\theta_{0,n}$, $\theta_{t,n}$ and $\theta_{y,n}$ are respectively the fixed frame collective, tilt and yaw pitch signals, and $\psi_{o,n}$ is the azimuth offset for each harmonic.

The possibilities of individually driving the pitch of the rotor blades, using for instance pitch drives 81, 82, 83, are now employed for increasing the wake recovery effects, or in other words to increase the wake mixing. By pitching the blades individually, the thrust force, and subsequently the power production, of the turbine can be controlled close to the greedy optimum (step 205).

The proposed control strategy is evaluated, as an example, in the Simulator fOr Wind Farm Applications (SOWFA), which is a high-fidelity simulation environment developed by the US. National Renewable Energy Laboratory (NREL). SOWFA is a large-eddy solver for the fluid dynamics in the turbulent atmosphere and its interaction with one or multiple wind turbines, accounting for the Coriolis force and Buoyancy effects. Turbines are modelled as actuator disks or actuator lines. In this work, SOWFA was adapted to allow the specification of a different pitch setpoint for each individual blade. Simulations in this work are of a neutral atmospheric boundary layer (ABL) in which the inflow was generated through a so called precursor simulation. Several properties of the simulation setup are listed below.

Numerical Simulation Scheme in SOWFA:
  Turbine: NREL 5MW reference turbine
  Rotor diameter: 126.4 m
  Domain size: 3 km×3 km×1 km
  Cell size (outer region): 10 m×10 m×10 m
  Cell size (near rotor): 1.25 m×1.25 m×1.25 m
  ABL stability: Neutral
  Inflow wind speed: 8.0 m/s
  Inflow turbulence intensity: 5.9%

As a baseline case to the control method according to the disclosure, the so-called greedy control strategy will be used. This approach denotes that the interaction between wind turbines is neglected, and therefore all turbines operate at their individual optimum. This implies that the rotor is yawed perpendicular to the wind and, for below-rated wind conditions, the pitch angles and generator torque are controlled such that the optimal power extraction from the wind is achieved. This case serves as a good baseline, since it is still a commonly implemented strategy in wind farms. With this strategy, the power production of the upstream turbine is optimal, but the wake deficit is relatively high resulting in lower performance of downstream machines.

In the control method according to an embodiment of the disclosure individually pitching the blades according to the periodic variation of the pitch angles $\theta_1$, $\theta_2$, $\theta_3$ is used to stimulate wake mixing by individually varying the induction factors of a blade and thereby of the yaw angle of attack of a turbine. The method of control enables imposing yaw and tilt moments on the rotor, as seen in step 207, by applying the MBC transformation, as explained above. These yaw and tilt moments 207 can subsequently lead to a forced wake mixing, with minor variations in power and wake velocity. This is achieved by superimposing the periodic variation of the pitch angles $\theta_1$, $\theta_2$, $\theta_3$ (step 204) on the collective blade pitch angles of a wind turbine.

These projected load signals are first transformed into the rotating frame by using the MBC transformation explained above to obtain the implemented pitch angles. For identical sinusoidal tilt and yaw signals, wherein the yaw signal has phase delay of 90°, this results, according to the common trigonometry formulas, in a sinusoidal pitch signal β with a different frequency:

$$\beta_b = \cos(\psi_b(t))\cos(2\pi ft) + \sin(\psi_b(t))\sin(2\pi ft)$$
$$= \cos(\psi_b(t) + 2\pi ft)$$
$$= \cos(2\pi f_h t + \phi_b),$$

with $\psi_b$ the azimuth position of blade number b, $f_h$ the new helix excitation frequency and $\phi_b$ the phase offset of blade b. It can thus be determined that $f_h = f + f_r$, where $f_r$ is the rotation frequency of the rotor. For the NREL 5MW reference turbine, the rotor speed at $U_\infty = 8$ m/s is equal to $f_r \approx 9.5$ rpm ≈ 0.158 Hz. Therefore, the pitch frequency $f_h$ of an embodiment referred to as Helix IPC will be slightly higher than the rotational frequency of the blade; for St=0.25, $f_h \approx 0.174$ Hz.

Alternative embodiment are, for instance, found if the periodic tilt function 2011 is set to zero (Yaw IPC), or instead the periodic yaw function 2012 is set to zero (Tilt IPC). In that case the inverse MBC (step 203) and common trigonometry formulas lead to periodic variation of the pitch angles $\theta_1$, $\theta_2$, $\theta_3$ wherein the periodic variation then becomes a superposition of two sinusoidal signals, the first sinusoidal signal with a first frequency $f_h = f + f_r$ and the second sinusoidal signal with a second frequency $f_h = f_r - f$.

The effect of applying the periodic variation of the pitch angles $\theta_1$, $\theta_2$, $\theta_3$ is applied to respective blades 51, 52, 53, is for instance, schematically shown in FIG. 6A and FIG. 6B. In FIG. 6A the schematic representation of the location of the wake 9 (i.e. the location of the centre of the wake, seen in cross-section of the wake) at different time instances during one period T=1/f for an embodiment called Tilt IPC is shown. In the Tilt IPC embodiment, the periodic yaw function 2012 is set to zero and a sinusoidal tilt function with predetermined frequency f is used for determining the predetermined periodic functions with which the pitch angles of the individual blades are varied. The location of the wake 9 is dynamically changing, between an upper and lower position with respect to the rotor 5, as seen perpendicular to the rotor plane IV, over the course of a period T, wherein T=1/f.

In FIG. 6B the resulting change of the location of the wake 9 due to Helix IPC is shown. The location of the wake 9 (i.e. the location of the centre of the wake, seen in cross-section of the wake) with respect to the rotor at different time instances during one period T=1/f. The location of the wake 9 is dynamically changing, as seen perpendicular to the rotor plane IV. The wake 9 circles from an upper position with respect to the rotor 5 at t=0, to a rightmost position at t=T/4, to a lower position at t=T/2, a leftmost position at t=3T/4, back to the upper position at t=T, thereby completing a round over the course of a period T, wherein T=1/f. As is shown in FIG. 7 and described below, the Helix IPC embodiment leads to a helical shaped wake around the rotor axis, hence obtaining its name. These simulations have been performed with a phase offset of 90° between (identical) tilt and yaw signals, thereby results in a clockwise (CW) screwing motion of the helix around the rotor axis as seen from the upwind direction parallel to the rotor axis. In case a phase offset of 270° between the tilt and yaw signals a counter-clockwise (CCW) screwing motion of the helix around the rotor axis is obtained.

Furthermore, the wake may not only generated at a different location, but the wake may additionally or alternatively be aimed in a different direction.

To evaluate the effects of the Helix, Tilt and Yaw IPC embodiments on the power production of the turbine as well as the resulting wake deficit 1000s simulations in the SOWFA solver have been executed. The results of these simulations are shown in the table below.

|  | CW Helix 2.5° | CCW Helix 2.5° | Tilt 2.5° | Yaw 2.5° | CW Helix 4° | CCW Helix 4° |
| --- | --- | --- | --- | --- | --- | --- |
| Power | −2.3% | −2.0% | −1.1% | −1.2% | −5.3% | −4.7% |
| Variation of Power | −6.5% | −7.6% | −4.3% | −3.0% | −13.5% | −15.1% |
| Variation of Thrust | −5.0% | −6.7% | −3.6% | −2.3% | −12.5% | −14.2% |
| Energy at 3D | +10.2% | +6.1% | +5.1% | +2.6% | +24.0% | +15.5% |
| Energy at 5D | +10.7% | +6.1% | +5.2% | +2.7% | +25.2% | +15.8% |
| Energy at 7D | +11.0% | +6.4% | +5.4% | +3.1% | +26.0% | +16.6% |

The table shows the results of the simulations in SOWFA for clockwise and counter-clockwise Helix IPC, Tilt IPC and Yaw IPC embodiments of the control method, wherein the clockwise (CW) and counter-clockwise (CCW) Helix IPC embodiments have been evaluated with pitch amplitude β of 2.5° and 4°. Results are given in terms of the power production, variations in power and thrust, and wake recovery. All results are shown with respect to the baseline case of greedy control.

The new control method leads to a maximum power loss compared to baseline of only 5.3% for the embodiments tested. On the other hand, the amount of energy in the wake is increased with up to 26%. The new control method also leads to a decrease in the variation in power for all embodiments tested, which means that a more constant power production is obtained, which is beneficial for grid stability. In addition, the variation in power and variation of the thrust force are also reduced, thereby demonstrating that the method does not only have advantages in a wind farm setup, but also for individual turbines where one aims to provide a more stable power output (i.e. less variation) and to reduce some fatigue loading due to the thrust force (i.e. a lower variation of the thrust force).

FIG. 7 shows on the left side a wind turbine 1, comprising a rotor 5 comprising three blades 51, 52, 53 that is controlled the base line case of a greedy control. Downstream of the turbine 1, a wake 91 is shown wherein a grey section implies a reduced wind speed with respect the surrounding air. The darker the grey-tone, the larger the reduction. Hence, it is seen that the wake 91 shows little signs of mixing even at distances of ten times the rotor diameter (10D). Also shown is the thrust force 54 that is mirrored with respect to the rotor plane IV. Over time the orientation of the thrust force 54 remains substantially stationary (i.e. it shows substantially no change of direction over time). Note that, in order to clearly show the resulting helix-shaped wake, the simulations for obtaining FIG. 7 have been performed on the basis of a uniform inflow.

The right part of FIG. 7 shows the same turbine 1 that is controlled using the Helix IPC embodiment of the control method results in a (rotating) helix-shaped wake 92 behind the turbine. Due to this helix-shaped wake 92, wake mixing with the surrounding air is increased, whereby the wake is dissolved much faster. Already at a distance of approximately 5D the wake effect are significantly reduced. Thereby, wind turbines controlled with the control method according to the disclosure can be placed closer to each other as compared to more traditionally controlled wind turbines, thereby increasing the potential power production of a wind farm. Also shown is the thrust force 55 that is mirrored with respect to the rotor plane IV. Using the Helix IPC embodiment, the thrust force 55 actually shows a slight orientation variation with respect to the incoming wind, when compared to thrust force 54. The orientation of the thrust force 55 can be seen, during operation, to vary and to actually cycle along the rotor in the same pace as the cycling of the initial section (i.e. origin) 93 of the wake 92. This relates to the fact that the predefined periodic function is defined such that the rotational position of the blade in the rotor plane at which the blade is at the first pitch angle is displaced from rotation to rotation.

As defined herein, when reference is made to dynamically changing the location of a wake formed downstream of a wind turbine, the location (i.e. the position) of the centre of the wake (i.e. the geometrical centre of the wake in cross-section, as shown in FIGS. 6A and 6B. relative to an imaginary line in the direction of the rotor axis (i.e. line II ub FIG. 1A) of the turbine) may in fact be dynamically changing. Furthermore, when reference is made to dynamically changing the direction of a wake formed downstream of a wind turbine, the direction into which the wake is steered from the turbine may be changing dynamically.

The present disclosure is not limited to the embodiment shown, but extends also to other embodiments falling within the scope of the appended claims.

The invention claimed is:

1. A method of controlling a wind turbine comprising a rotor comprising at least a first blade, the method comprising:
varying an induction factor of the first blade over time by dynamically changing a pitch angle of the first blade over time between a first pitch angle and a second pitch angle while the first blade is rotating, wherein:
the first pitch angle is different from the second pitch angle, and
the dynamic change of the pitch angle over time is controlled such that respective rotational positions of the first blade in a rotor plane at which the first blade is at the first pitch angle is displaced from rotation to rotation, and respective rotational positions of the first blade at which the first blade is at the second pitch angle is displaced from rotation to rotation and the varying of the induction factor of the first blade occurs at different angular positions in the rotor plane over time, such that a location and/or direction of a wake formed downstream of the wind turbine is dynamically changing with respect to the rotor of the wind turbine.

2. The method of controlling a wind turbine according to claim 1, the method further comprising:
imposing yaw and/or tilt moments on the rotor for obtaining forced wake mixing by superimposing a periodic variation of the pitch angle of the first blade of the wind turbine for dynamically changing the pitch angle of the first blade.

3. The method of controlling a wind turbine according to claim 2, further comprising:
imposing both yaw moments and tilt moments on the rotor, wherein the yaw moments and tilt moments have a common predefined frequency and have a predefined phase offset relative to each other.

4. The method of controlling a wind turbine according to claim 1,
wherein varying the induction factor of the first blade over time comprises dynamically changing the pitch angle of the first blade according to a predefined periodic function, and
wherein the predefined periodic function is defined so that the respective rotational positions of the first blade at which the first blade is at the first pitch angle and second pitch angle are displaced in time.

5. The method of controlling a wind turbine according to claim 4, wherein:
the rotor comprises a second blade,
the method further comprises varying an induction factor of the second blade over time by dynamically changing a pitch angle of the second blade according to the predefined periodic function, and
the dynamic change of the pitch angle of the second blade differs by a phase offset with the dynamic change of the pitch angle of the first blade.

6. The method of controlling a wind turbine according to claim 5, wherein the phase offset is equal to an angle of intersection between the first and second blade in the rotor plane.

7. The method of controlling a wind turbine according to claim 4,
wherein the predefined periodic function comprises a first sinusoidal function with a first frequency, and
wherein the first frequency differs from a rotational frequency of the rotor or its multiples.

8. The method of controlling a wind turbine according to claim 7,
wherein the predefined periodic function comprises a superposition of the first sinusoidal function and a second sinusoidal function with a second frequency, and
wherein the first and second frequencies are different.

9. The method of controlling a wind turbine according to claim 8, wherein a value of the first frequency or a value of the second frequency is equal to the rotational frequency of the rotor increased with or decreased with a predetermined frequency, the predetermined frequency being a nonzero frequency smaller than the rotational frequency.

10. The method of controlling a wind turbine according to claim 1, wherein:
the rotor comprises a second blade,
the method further comprises varying an induction factor of the second blade over time by dynamically changing a pitch angle of the second blade between the first pitch angle and the second pitch angle, and
wherein a time at which the first blade is at the first pitch angle differs from a time at which the second blade is at the first pitch angle.

11. The method of controlling a wind turbine according to claim 1, wherein the dynamic change of the pitch angle over time is obtained by performing a reverse multi-blade coordination (MBC) transformation on a time-varying yaw function that is defined in a non-rotating reference frame, or on a time-varying tilt function that is defined in a non-rotating reference frame, or on a combination of the time-varying yaw and tilt functions.

12. The method of controlling a wind turbine according to claim 11, wherein the time-varying yaw function is periodic yaw function and/or the time-varying tilt function is a periodic tilt function and wherein, by performing the reverse multi-blade coordination (MBC) transformation, a predefined periodic function is obtained, such that dynamically changing the pitch angle over time is dynamically changing the pitch angle according to the predefined periodic function.

13. The method of controlling a wind turbine according to claim 12, wherein a periodic tilt function and/or periodic yaw function is a sinusoidal function with a predetermined frequency.

14. The method for controlling a wind turbine according to claim 13, wherein the predetermined frequency is determined at least in dependence of a diameter of the rotor, a rotational speed of the rotor and/or an inflow wind speed that is determined upstream of the wind turbine.

15. The method for controlling a wind turbine according to claim 13,
wherein the predetermined frequency is determined at least in dependence of a Strouhal number, and
wherein the Strouhal number is between 0.05 and 1.0.

16. The method for controlling a wind turbine according to claim 1, wherein a difference between the first pitch angle and the second pitch angle is 30° or less.

17. The method of controlling a wind turbine according to claim 1, wherein the dynamic change of the pitch angle of the first blade over time is such that a periodical change of an orientation of a thrust force is experienced by the rotor.

18. The method of controlling a wind turbine according to claim 1, wherein a resulting wake is a helical shaped wake around a rotor axis.

19. A wind turbine controller arranged for controlling a wind turbine comprising a rotor comprising at least a first blade, wherein the controller is arranged for varying an induction factor of the first blade over time by dynamically changing a pitch angle of the first blade over time between a first pitch angle and a second pitch angle while the first blade is rotating, wherein the first pitch angle is different from the second pitch angle, and wherein the dynamic change of the pitch angle over time is so that respective rotational positions of the first blade in a rotor plane at which the first blade is at the first pitch angle is displaced from rotation to rotation, and respective rotational positions of the first blade at which the first blade is at the second pitch angle is displaced from rotation to rotation, and the varying of the induction factor of the first blade occurs at different angular positions in the rotor plane over time, such that a location and/or direction of a wake formed downstream of the wind turbine is dynamically changing with respect to the rotor of the wind turbine.

20. A wind turbine comprising a rotor comprising at least a first blade, further comprising a wind turbine controller according to claim 19.

21. An array of at least two wind turbines, wherein, for a given wind direction, a second wind turbine is arranged at least partially downstream in a wake of a first wind turbine, wherein the first and second wind turbine each comprise a rotor comprising at least a first blade and, wherein at least the first wind turbine comprises a wind turbine controller according to claim 19.

22. The wind turbine controller according to claim 19, which is configured to dynamically change the pitch angle of the first blade over time such that a periodical change of an orientation of a thrust force is experienced by the rotor.

23. The wind turbine controller according to claim 19, which is further configured to impose yaw and/or tilt moments on the rotor for obtaining forced wake mixing by superimposing a periodic variation of the pitch angle of the first blade for dynamically changing the pitch angle of the first blade.

24. The wind turbine controller according to claim 23, which is further configured to impose both yaw moments and tilt moments on the rotor, wherein the yaw moments and tilt moments have a common predefined frequency and have a predefined phase offset relative to each other.

* * * * *